(12) United States Patent
Garcia et al.

(10) Patent No.: US 10,833,781 B2
(45) Date of Patent: Nov. 10, 2020

(54) ANTENNA CALIBRATION

(71) Applicant: International Business Machines Corporation, Armonk, NY (US)

(72) Inventors: Alberto Valdes Garcia, Chappaqua, NY (US); Bodhisatwa Sadhu, Fishkill, NY (US); Yahya Mesgarpour Tousi, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/686,754

(22) Filed: Nov. 18, 2019

(65) Prior Publication Data

US 2020/0083967 A1 Mar. 12, 2020

Related U.S. Application Data

(62) Division of application No. 15/147,033, filed on May 5, 2016, now Pat. No. 10,484,106.

(51) Int. Cl.
*H04B 7/10* (2017.01)
*H01Q 3/26* (2006.01)
*H04B 17/12* (2015.01)
*H04B 17/10* (2015.01)

(52) U.S. Cl.
CPC .......... *H04B 17/12* (2015.01); *H04B 17/102* (2015.01)

(58) Field of Classification Search
CPC ........ H04B 17/12; H04B 17/102; H04B 7/10; H04B 17/10; H01Q 3/267; H01Q 3/26
See application file for complete search history.

(56) References Cited

U.S. PATENT DOCUMENTS

| | | | |
|---|---|---|---|
| 5,861,843 A | 1/1999 | Sorace et al. |
| 6,157,343 A | 12/2000 | Andersson et al. |
| 6,163,296 A | 12/2000 | Lier et al. |
| 6,252,542 B1 | 6/2001 | Sikina et al. |
| 6,624,784 B1 | 9/2003 | Yamaguchi |
| 6,771,216 B2 | 8/2004 | Patel et al. |

(Continued)

FOREIGN PATENT DOCUMENTS

| | | |
|---|---|---|
| EP | 2290382 A1 | 3/2011 |
| WO | WO2008003022 A2 | 1/2008 |
| WO | WO2012065990 A1 | 5/2012 |

OTHER PUBLICATIONS

Vieira, Joao, et al., "Reciprocity calibration methods for massive MIMO based on antenna coupling", In Global Communications Conference (GLOBECOM), 2014 IEEE, pp. 3708-3712. IEEE, 2014.

(Continued)

*Primary Examiner* — Pablo N Tran
(74) *Attorney, Agent, or Firm* — Daniel Morris; Otterstedt, Wallace & Kammer, LLP (57) ABSTRACT

An array of antenna elements are located in relation with a plurality of pre-characterized reference detectors. At baseband frequencies, a transmit radiation pattern of the array of antenna elements is sensed with the plurality of pre-characterized reference detectors, at a plurality of phase and gain settings, to detect mismatch among two or more elements of the array of antenna elements. Phase and gain settings for the array of antenna elements are updated to correct the mismatch.

10 Claims, 9 Drawing Sheets

(56) References Cited

U.S. PATENT DOCUMENTS

| | | | |
|---|---|---|---|
| 7,205,936 B2* | 4/2007 | Park | G01S 7/4008 |
| | | | 342/174 |
| 7,889,129 B2* | 2/2011 | Fox | H01Q 21/0018 |
| | | | 342/376 |
| 8,565,699 B1* | 10/2013 | Lipshitz | H03G 3/3042 |
| | | | 455/127.2 |
| 8,565,798 B2* | 10/2013 | Parker | H01Q 3/2611 |
| | | | 342/181 |
| 9,035,828 B2* | 5/2015 | O'Keeffe | H04B 7/10 |
| | | | 342/368 |
| 9,113,346 B2* | 8/2015 | Pivit | H01Q 1/246 |
| 9,712,191 B2* | 7/2017 | Johansson | H01O 3/2605 |
| 10,103,431 B2* | 10/2018 | Swirhun | H01Q 3/36 |
| 10,128,894 B1* | 11/2018 | O'Brien | H04B 17/14 |
| 10,211,527 B2* | 2/2019 | Safavi-Naeini | H01Q 3/267 |
| 10,291,056 B2* | 5/2019 | Bell | H02J 50/90 |
| 10,484,038 B1* | 11/2019 | Kimball | H04B 17/12 |
| 10,484,106 B2 | 11/2019 | Garcia et al. | |
| 2006/0044185 A1* | 3/2006 | Jin | H01Q 3/267 |
| | | | 342/368 |
| 2006/0202891 A1* | 9/2006 | Izumi | H04B 17/21 |
| | | | 342/368 |
| 2010/0127932 A1 | 5/2010 | Heikkinen et al. | |
| 2011/0084887 A1 | 4/2011 | Mow et al. | |
| 2012/0020392 A1* | 1/2012 | O'Keeffe | H04B 7/10 |
| | | | 375/221 |
| 2013/0214965 A1 | 8/2013 | Malmqvist et al. | |
| 2013/0235962 A1 | 9/2013 | O'Keefe et al. | |
| 2015/0063823 A1* | 3/2015 | Eiselt | H04B 10/5167 |
| | | | 398/140 |
| 2018/0175947 A1* | 6/2018 | Tiebout | H03G 3/3036 |

OTHER PUBLICATIONS

Geng, Jian, et al; "On antenna calibration for the TDD-based network MIMO system", InCommunications (ICC), 2013 IEEE International Conference on, pp. 5866-5871. IEEE, 2013.

Paul J. Otterstedt, List of IBM Patents or Patent Applications Treated as Related, Dec. 13, 2019, pp. 1-2.

* cited by examiner

ANTENNA CALIBRATION

CROSS-REFERENCE TO RELATED APPLICATIONS

This patent application is a divisional of U.S. patent application Ser. No. 15/147,033 filed May 5, 2016, entitled "ANTENNA CALIBRATION." The complete disclosure of the aforementioned U.S. patent application Ser. No. 15/147,033 is expressly incorporated herein by reference in its entirety for all purposes.

STATEMENT OF GOVERNMENT RIGHTS

Not Applicable.

FIELD OF THE INVENTION

The present invention relates to the electrical, electronic, computer, and mechanical arts, and, more particularly, to mobile and wireless networking and the like.

BACKGROUND OF THE INVENTION

Measurement and calibration of beam patterns is pertinent for multiple antenna systems such as phased arrays and multiple-input and multiple-output (MIMO) systems. Conventional calibration techniques used for antenna validation tend to be costly and/or time-consuming, involve the use of external antennas, employ high frequency signal characterization, rely on mechanical movements for each test, and/or do not take the antenna pattern into account.

SUMMARY OF THE INVENTION

Principles of the invention provide techniques for antenna calibration. In one aspect, an exemplary method of calibrating an array of antenna elements in a transmit mode includes locating the array of antenna elements in relation with a plurality of pre-characterized reference detectors; sensing, at baseband frequencies, with the plurality of pre-characterized reference detectors, at a plurality of phase and gain settings, a transmit radiation pattern of the array of antenna elements, to detect mismatch among two or more elements of the array of antenna elements; and updating phase and gain settings for the array of antenna elements to correct the mismatch.

In another aspect, an exemplary method of calibrating an array of antenna elements in a receive mode includes locating the array of antenna elements in relation with a plurality of pre-characterized reference transmitters; sensing, at baseband frequencies, with the array of antenna elements, at a plurality of phase and gain settings, a receive radiation pattern of the array of antenna elements, received from the plurality of pre-characterized reference transmitters, to detect mismatch among two or more elements of the array of antenna elements; and updating phase and gain settings for the array of antenna elements to correct the mismatch.

In still another aspect, an exemplary antenna calibration system, for calibrating an array of antenna elements in a transmit mode, includes an array of variable gain amplifiers and phase shifters corresponding to the array of antenna elements and having a transmit signal input and a plurality of gain and phase control inputs; a plurality of pre-characterized reference detectors, located in relation with the array of antenna elements, and positioned to sense, at baseband frequencies, at a plurality of phase and gain settings of the array of variable gain amplifiers and phase shifters, a transmit radiation pattern of the array of antenna elements, to detect mismatch among two or more elements of the array of antenna elements; and logic configured to update phase and gain settings of the array of variable gain amplifiers and phase shifters for the array of antenna elements to correct the mismatch.

In yet another aspect, an exemplary antenna calibration system, for calibrating an array of antenna elements in a receive mode, includes an array of variable gain amplifiers and phase shifters corresponding to the array of antenna elements and having a receive signal output and a plurality of gain and phase control inputs; a plurality of pre-characterized reference transmitters, located in relation with the array of antenna elements, and positioned to radiate to the array of antenna elements; and logic configured to update phase and gain settings of the array of variable gain amplifiers and phase shifters for the array of antenna elements to correct mismatch among two or more elements of the array of antenna elements sensed, at baseband frequencies, with the array of antenna elements As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed. For the avoidance of doubt, where an actor facilitates an action by other than performing the action, the action is nevertheless performed by some entity or combination of entities.

Techniques of the present invention can provide substantial beneficial technical effects. For example, one or more embodiments provide one or more of:

Fast, electronically controlled measurements without need for mechanical movements—reduces test time by orders of magnitude No RF measurements are required: all measurements taken at baseband frequencies reducing measurement costs End to end calibration method measuring the performance of interest directly, rather than modeling the beam pattern using indirect measurements Calibration of imperfections and variations among individual antenna radiation patterns (prior art methods assume uniform, identical radiation patterns between antennas)

Scalable technique: accuracy can be easily improved by scaling the number of golden references These and other features and advantages of the present invention will become apparent from the following detailed description of illustrative embodiments thereof, which is to be read in connection with the accompanying drawings.

DETAILED DESCRIPTION OF PREFERRED EMBODIMENTS

As noted above, measurement and calibration of beam patterns is pertinent for multiple antenna systems such as phased arrays and multiple-input and multiple-output (MIMO) systems. Conventional calibration techniques used for antenna validation tend to be costly and/or time-consuming, involve the use of external antennas, employ high frequency signal characterization, rely on mechanical movements for each test, and/or do not take the antenna pattern into account.

One or more embodiments advantageously provide techniques for antenna calibration in phased arrays and MIMO systems. We have found that often, concern is primarily with side-lobe performance, and knowledge of the exact beam pattern for each chip is not needed. In many cases, a priori information about the phased array or MIMO system performance is available and can be utilized during calibration.

In one or more embodiments, for a transmitter, characterize a few "golden" receivers using standard over-the-air antenna measurements (in one or more embodiments, the receivers contain the function (down conversion in frequency for example) that allows the calibration to be performed with base band frequencies). These measurements involve radio frequency (RF) measurements, and will characterize each element using known prior art techniques. Place the golden receivers at specific spatial locations (angle and/or distance) of interest, typically side-lobe angles. Sense the radiation pattern at the angles of interest only. Perform measurements with different settings in the device under test (DUT) for mismatch information between different elements (see discussion of optional complete beam pattern estimation below). Actuate the transmitter gain and phase for the desired beam pattern at angles of interest while maintaining the highest main beam power level. For testing multiple DUTs, swap the DUTs in and out, while keeping the measurement setup unchanged.

Similarly, for a receiver, characterize a few "golden" transmitters. The "golden" receivers and "golden" transmitters are referred to herein as "golden" chips; the skilled artisan will appreciate whether the "golden" chip is functioning as a receiver or transmitter depending on whether the device under test (DUT) is in transmit or receive mode.

Figure 1A:
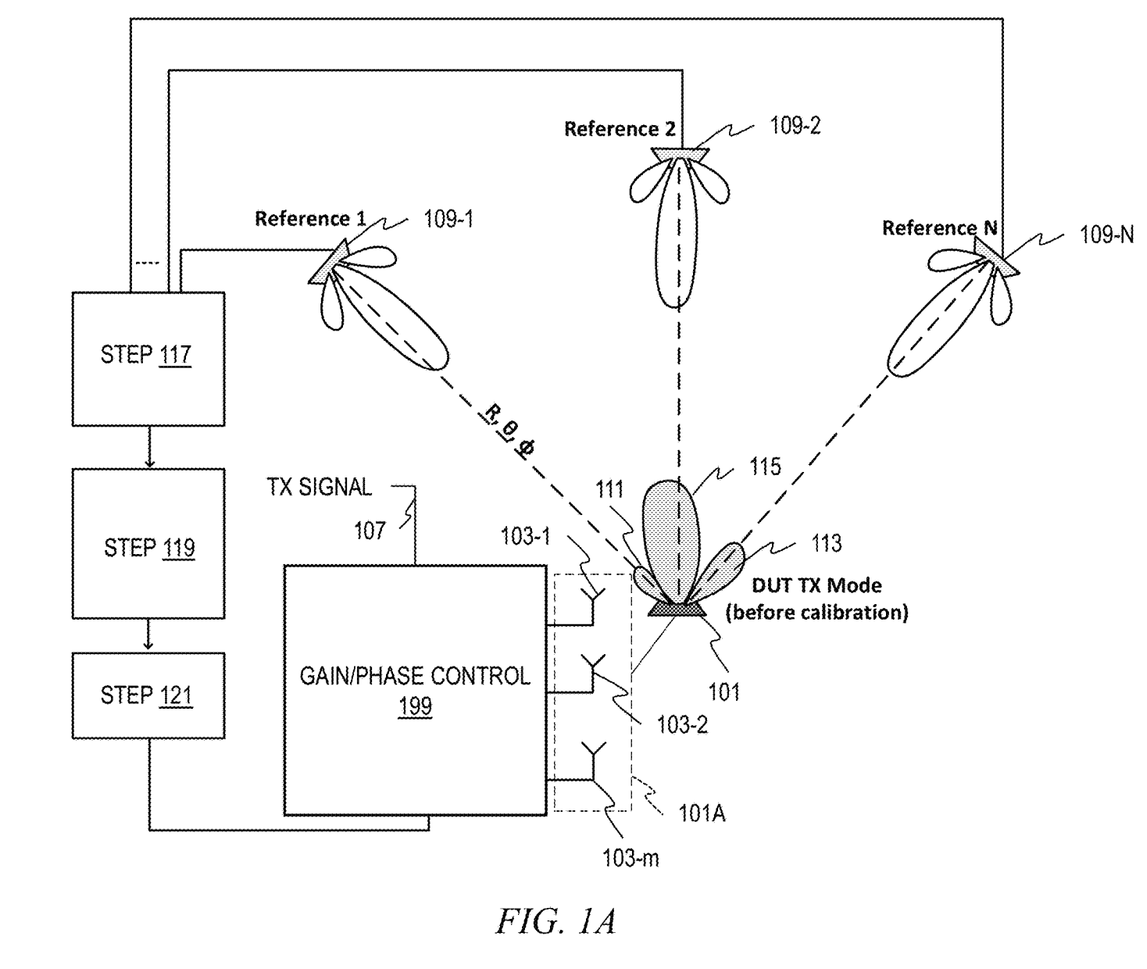
FIGS. 1A and 1B (collectively, FIG. 1) show a calibration setup in transmit (TX) mode, according to an aspect of the invention.
Figure 1B:
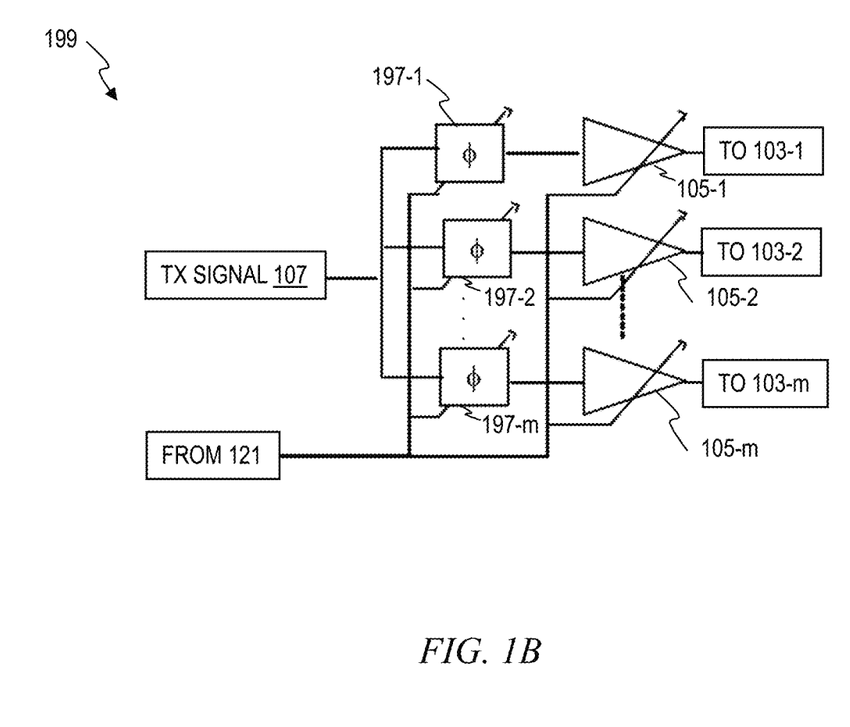
Figure 5:
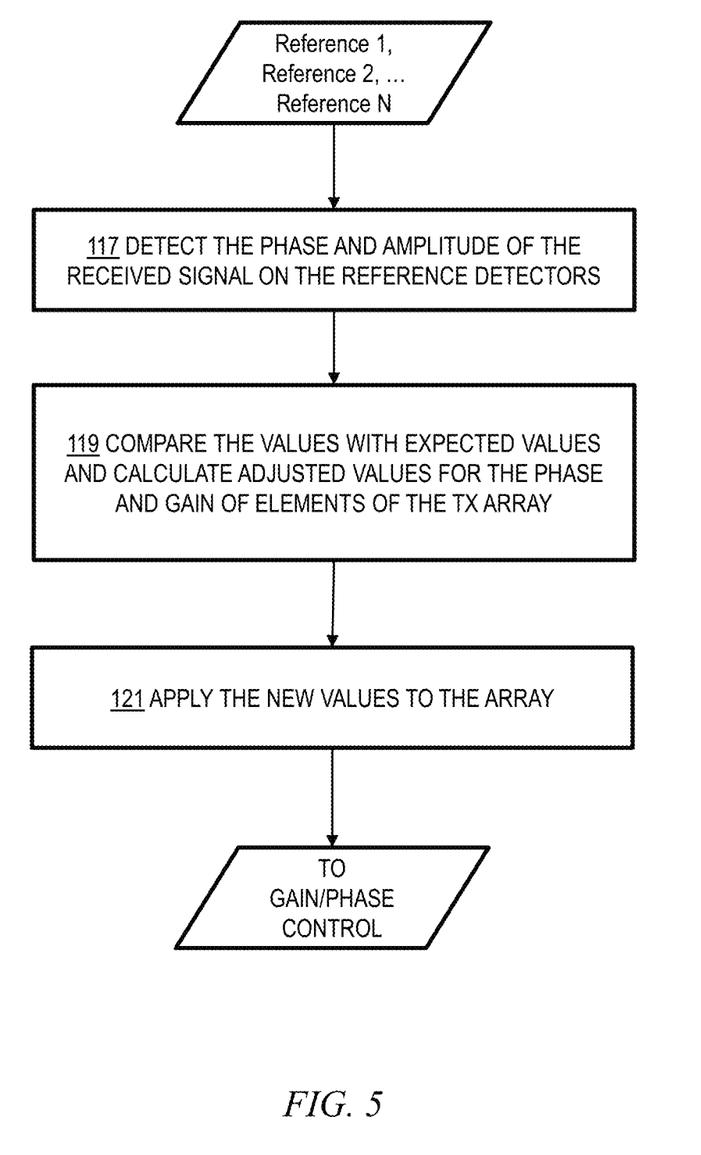
FIG. 5 shows details of method steps 117-121 of FIG. 1A, according to an aspect of the invention.

Referring now to FIGS. 1A, 1B, and 5, the device under test 101 is a phased antenna array shown schematically at 101A, including a plurality of antenna elements 103-1, 103-2 . . . 103-m. Each element is fed by a variable gain amplifier and phase shifter which are part of gain/phase control block 199 of FIG. 1A, shown in detail in FIG. 1B. In particular, each element is fed by a variable gain amplifier 105-1, 105-2 . . . 105-m and phase shifter 197-1, 197-2, 197-m in an arrangement providing gain and phase control. The signal to be transmitted is shown at 107. The references 1, 2 . . . N numbered 109-1, 109-2 . . . 109-N are located at polar coordinates R, θ, φ relative to the DUT 101 at locations of interest; in this instance, nominally aligned with side lobes 111, 113 and main lobe 115. FIG. 1A shows the situation before calibration. Main lobe 115 is not lined up with Reference 2 109-2 and side lobes 111, 113 are unequal. The references 109-1, 109-2 . . . 109-N are the above-mentioned golden receivers, in this non-limiting exemplary embodiment. In step 117, detect the phase and amplitude of the received signal on the reference detectors 109-1, 109-2 . . . 109-N. In step 119, compare the detected phase and amplitude with the values expected from an ideal phased array, and calculate adjusted values for the phase and gain for the elements 103-1, 103-2 . . . 103-m of the transmit array 101. In step 121, apply the new values to the array.

Figure 2:
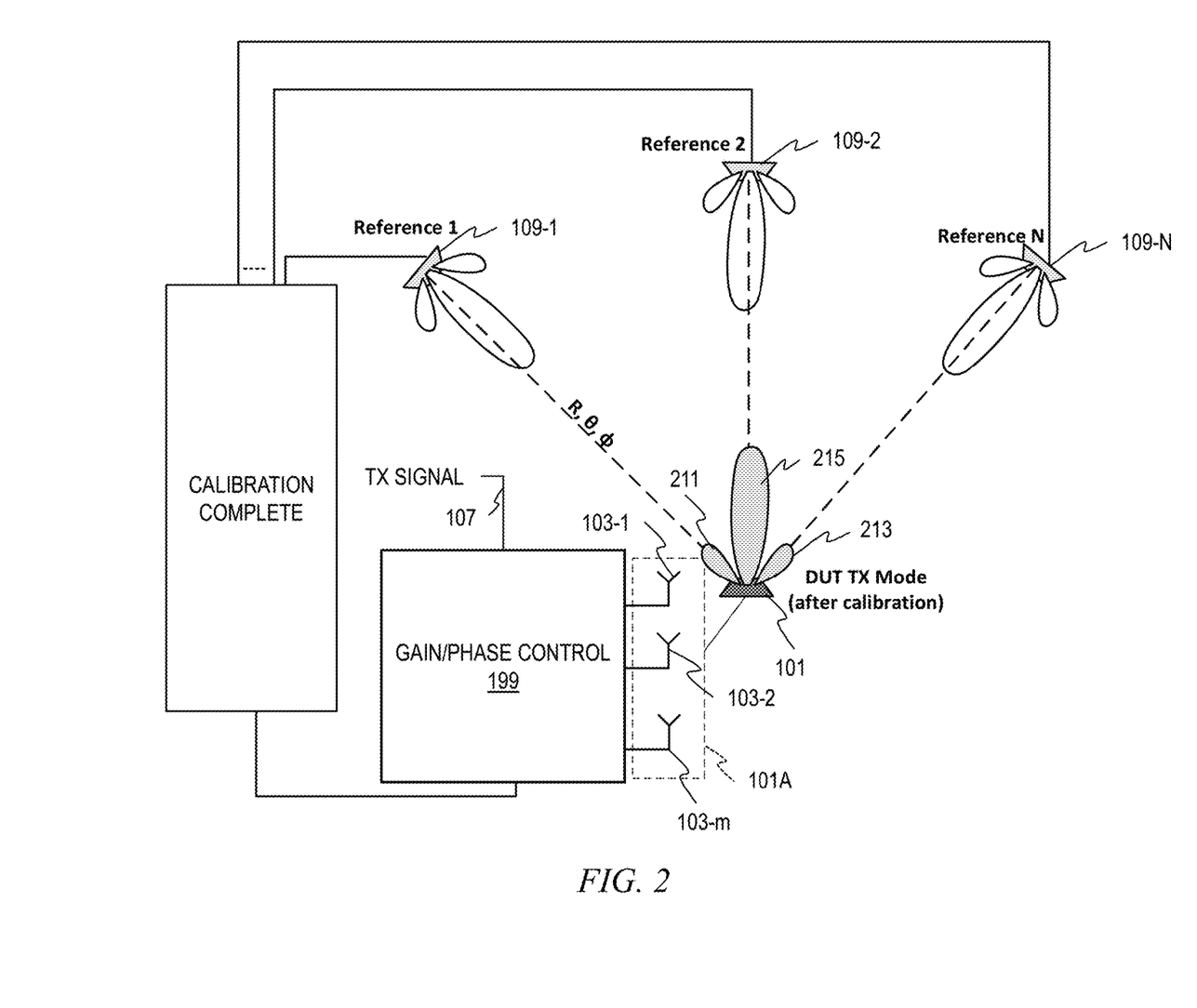
FIG. 2 shows a calibrated beam in transmit mode, according to an aspect of the invention.

FIG. 2 shows the situation after calibration, with like elements having the same reference character. The main lobe 215 is now lined up with Reference 2 109-2 and the side lobes 211, 213 are of similar size and lined up with Reference 1 109-1 and Reference N 109-N respectively.

In one or more embodiments, for a receiver, characterize a few golden transmitters using standard over-the-air antenna measurements. These measurements will involve RF measurements, and will characterize each element using prior art techniques. Place the golden transmitters at specific spatial locations (angle and/or distance) of interest, typically side-lobe angles. Sense the radiation pattern at the angles of interest only. Transmit a signal from different angles of interest to the DUT pointing at a fixed direction to sense receive antenna beam pattern at the angles of interest. Perform measurements with different settings in the DUT for mismatch information between different elements (see discussion of optional complete beam pattern estimation below). Actuate the receiver gain and phase for the desired beam pattern at angles of interest while maintaining the highest main beam receiver gain. For testing multiple DUTs, swap the DUTs in and out, while keeping the measurement setup unchanged.

Figure 3A:
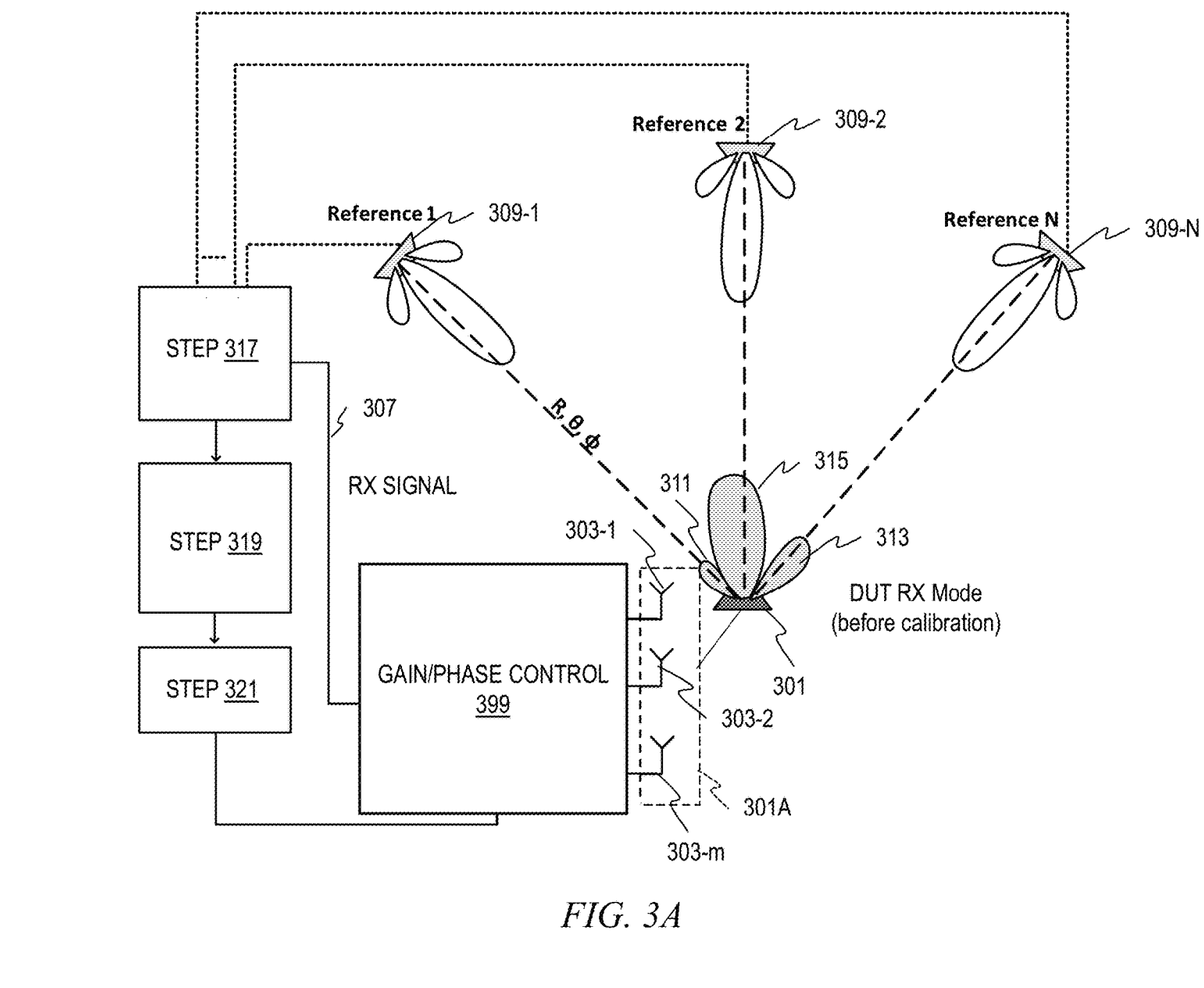
FIGS. 3A and 3B (collectively, FIG. 3) show a calibration setup in receive (RX) mode, according to an aspect of the invention.
Figure 3B:
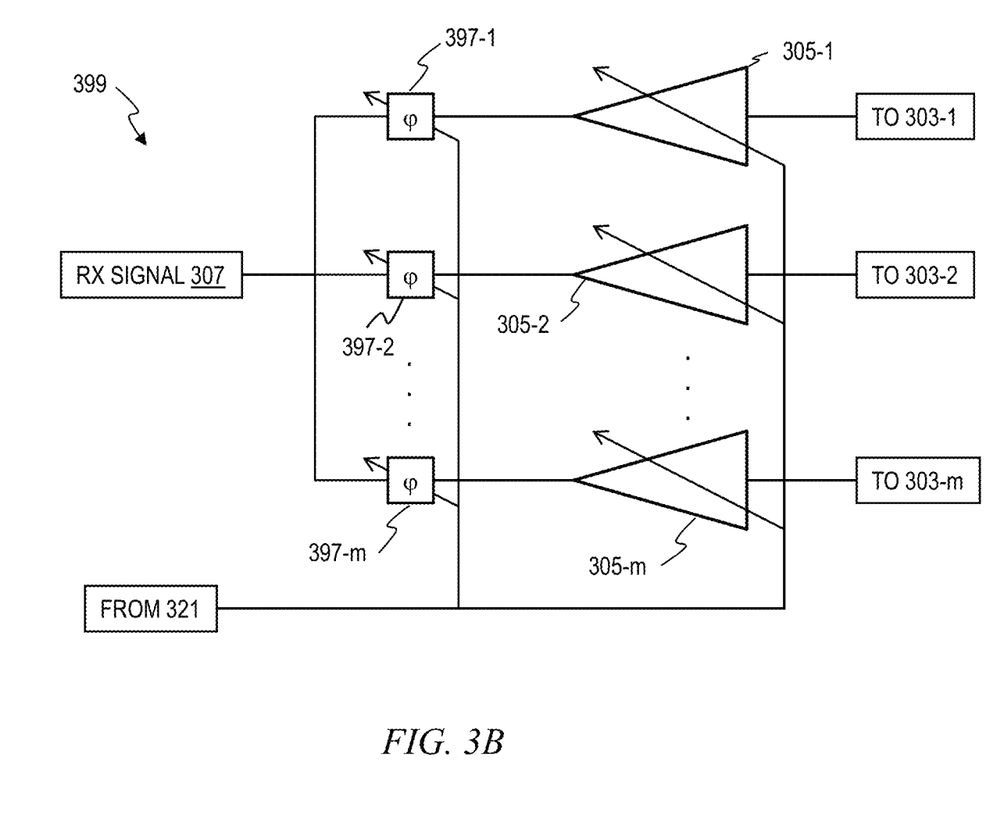
Figure 6:
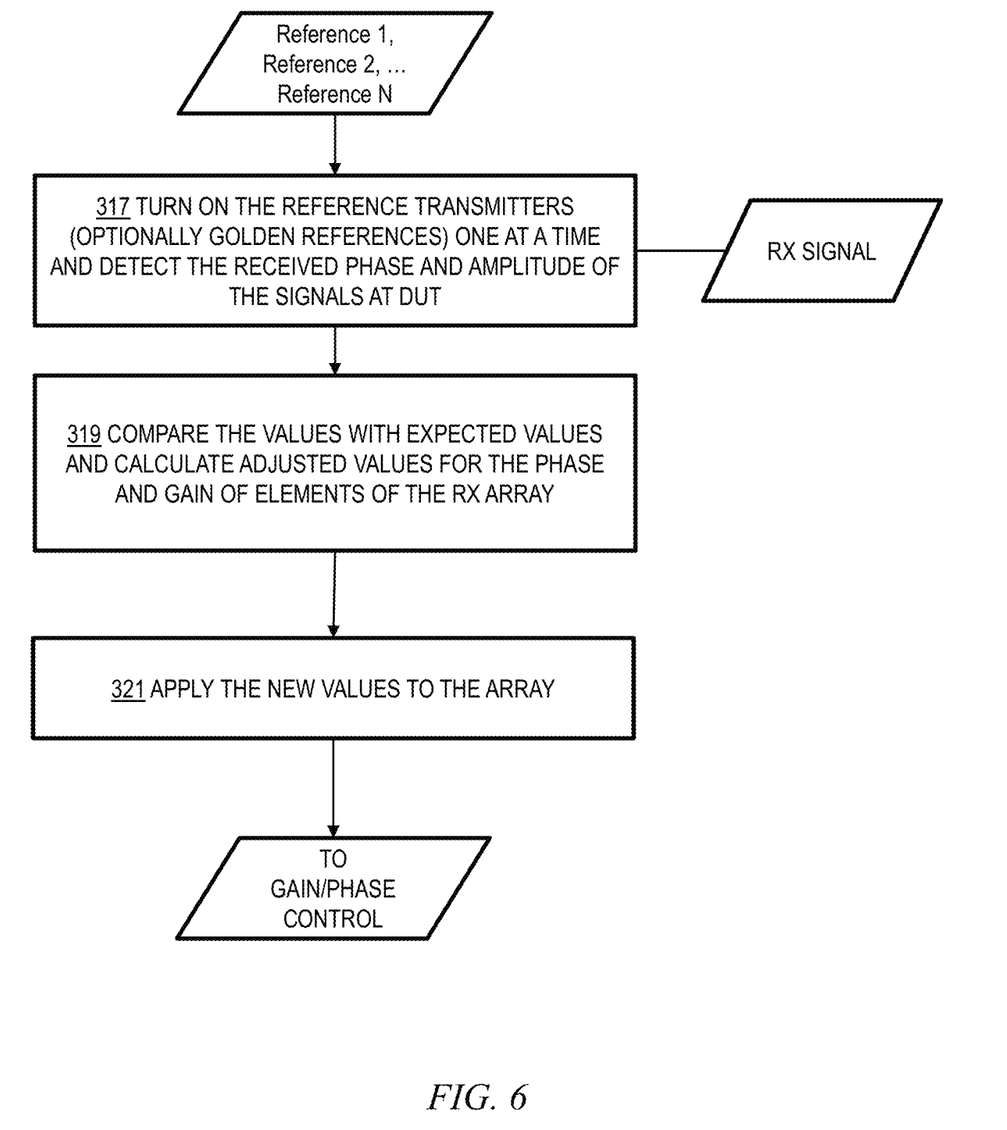
FIG. 6 shows details of method steps 317-321 of FIG. 3A, according to an aspect of the invention.

Referring now to FIGS. 3A, 3B, and 6, the device under test 301 is a phased antenna array shown schematically at 301A, including a plurality of antenna elements 303-1, 303-2 . . . 303-m. The signal received from each element is fed to a variable gain amplifier and phase shifter which are part of gain/phase control block 399 of FIG. 3A, shown in detail in FIG. 3B. In particular, the signal received from each element is fed to a variable gain amplifier 305-1, 305-2 . . . 305-m and phase shifter 397-1, 397-2, 397-m in an arrangement providing gain and phase control. The received signal is shown at 307. The references 1, 2 . . . N numbered 309-1, 309-2 . . . 309-N are located at polar coordinates R, θ, φ relative to the DUT 301 at locations of interest; in this instance, nominally aligned with side lobes 311, 313 and main lobe 315. FIG. 3A shows the situation before calibration. Main lobe 315 is not lined up with Reference 2 309-2 and side lobes 311, 313 are unequal. The references 309-1, 309-2 . . . 309-N are the above-mentioned golden chips, in this non-limiting exemplary embodiment. In step 317, turn on the reference transmitters 309-1, 309-2 . . . 309-N one at a time and detect the received phase and amplitude of the signals at the DUT 301. In step 319, compare the detected values with the values expected from an ideal phased array and calculate adjusted values for the phase and gain for the elements 303-1, 303-2 . . . 303-m of the receive array 301. In step 321, apply the new values to the array.

Figure 4:
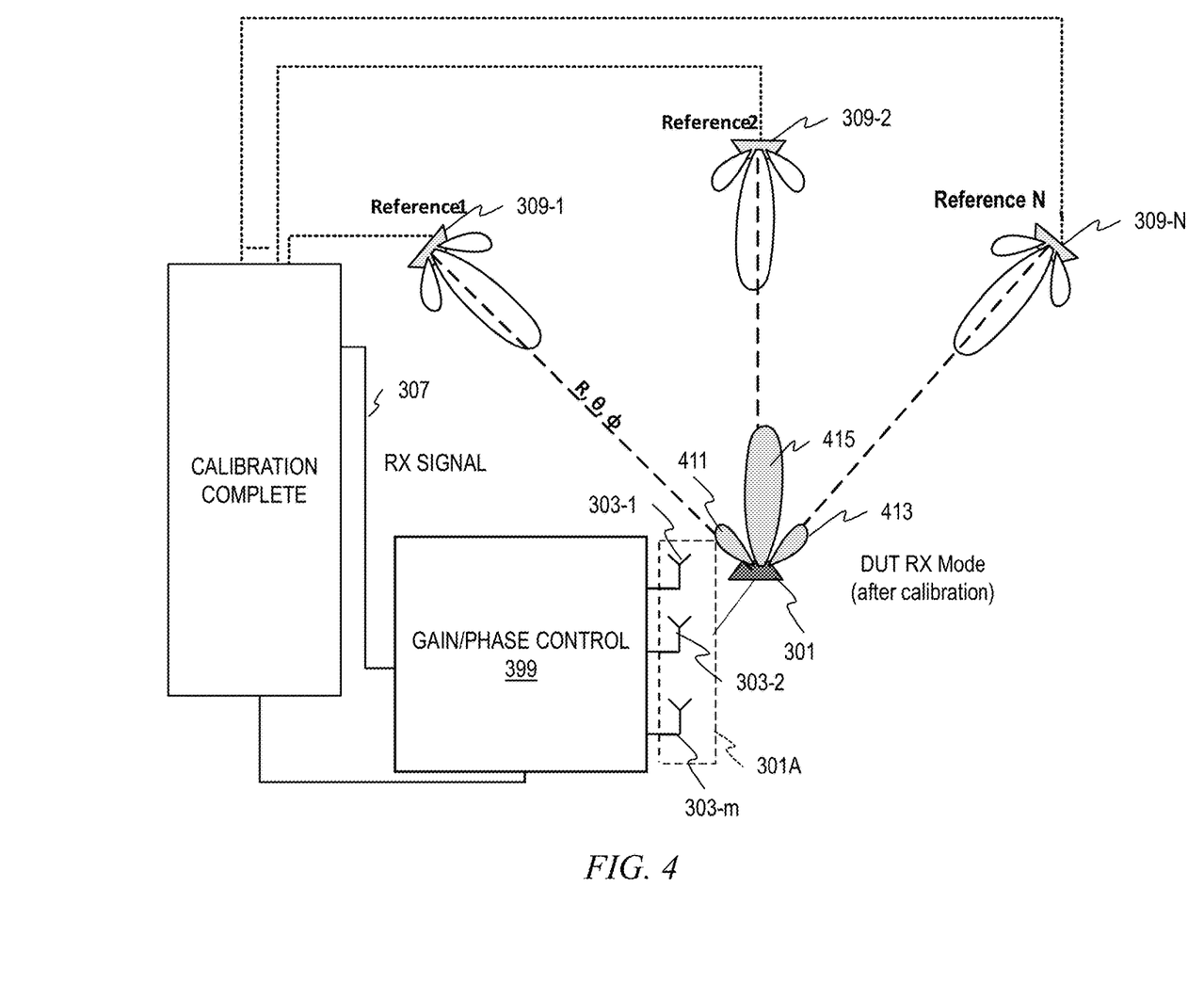
FIG. 4 shows a calibrated beam in receive mode, according to an aspect of the invention.

FIG. 4 shows the situation after calibration, with like elements having the same reference character. The main lobe 415 is now lined up with Reference 2 309-2 and the side lobes 411, 413 are of similar size and lined up with Reference 1 309-1 and Reference N 309-N respectively.

In one or more embodiments, for a phased array, already existing gain and phase adjustment knobs are used for actuating the correction. In an RF phase shifting architecture, gain and phase actuators are located in the RF chain. In a local oscillator (LO) phase shifting architecture, gain actuators are located in the RF chain, and phase actuators are in the local oscillator signals. In an intermediate frequency (IF) phase shifting architecture, gain and phase actuators are located at IF. In a baseband phase shifting architecture, gain and phase actuators are located at the analog and/or digital baseband.

As noted above, one or more embodiments provide one or more of:

Fast, electronically controlled measurements without need for mechanical movements—reduces test time by orders of magnitude No RF measurements are required: all measurements taken at baseband frequencies reducing measurement costs End to end calibration method measuring the performance of interest directly, rather than modeling the beam pattern using indirect measurements Calibration of imperfections and variations among individual antenna radiation patterns (prior art methods assume a uniform, identical radiation patterns between antennas)

Scalable technique: accuracy can be easily improved by scaling the number of golden references Optionally, the complete beam pattern can be estimated. Assume an N-element array, with k different directions. The number of unknowns is N*(2+k). This is so because the phase of each of the N elements is an unknown, thus N unknowns; the gain of each of the N elements is also unknown, thus another N unknowns; and the beam pattern of each of the N antennas is unknown; with K different directions, this corresponds to N*k unknowns. There will be M*p data points, where M is the number of golden chips and p is the number of DUT settings. Knowledge about the unknowns can be used to build a model based on the M*p data points.

Advantageously, one or more embodiments do not need to employ RF signals for calibration and do not require mechanical movements during calibration. On the contrary, one or more embodiments provide fast, electronically controlled measurements at baseband frequencies, covering multiple antenna directions. Furthermore, one or more embodiments calibrate and/or evaluate the complete array response performance, as opposed to some prior art techniques which calibrate the individual responses of different TX and RX paths within the antenna array. Even further, while one or more embodiments employ pre-calibrated transmitters or receivers, these are external to the DUT and hence do not impact its cost or complexity. In addition, one or more embodiments calibrate for the beam pattern of an antenna array from an RF performance perspective and measure beam pattern relevant metrics such as side lobes, but do not consider network-level performance. Moreover, one or more embodiments calibrate an antenna array according to its radiation pattern performance, and do not deal with channel characteristics.

Given the discussion thus far, it will be appreciated that, in general terms, an exemplary method of calibrating an array of antenna elements in a transmit mode includes locating the array of antenna elements 101, 101A in relation with a plurality of pre-characterized reference detectors 109-1, 109-2 . . . 109-N (detector and receiver used interchangeably herein). A further step includes sensing, at baseband frequencies, with the plurality of pre-characterized reference detectors, at a plurality of phase and gain settings, a transmit radiation pattern (e.g., lobes 111, 115, 113) of the array of antenna elements, to detect mismatch among two or more elements of the array of antenna elements. A still further step includes updating phase and gain settings for the array of antenna elements to correct the mismatch, as seen in FIG. 2.

In one or more embodiments, in the locating step, at least one of the plurality of pre-characterized reference detectors is located at an expected side lobe 111, 113 of the array of antenna elements.

In at least some instances, the sensing is carried out while maintaining a highest main beam power level for the array of antenna elements.

In some cases, in the locating step, the array of antenna elements includes a phased array.

In one or more embodiments, in the locating step, the plurality of pre-characterized reference detectors include nominal duplicates ("golden chips") of the array of antenna elements, characterized via over-the-air radio frequency measurements. Note that the "golden chips" can, but need not, be used as the detectors. Any suitable detectors can be used. However, an advantage to using the "golden chips" as detectors is that these chips can take the RF down to baseband so that RF detection is not needed. This reduces the cost of the setup. Both a transmitter and a receiver are needed in the same location, frequency, and bandwidth specifications, in one or more embodiments, which is another advantage of using the "golden chips." The "golden chips" are chips measured using conventional techniques, which come close to the theoretical performance.

Optionally, the complete beam pattern can be estimated for the array of antenna elements, as discussed above.

Furthermore, given the discussion thus far, it will be appreciated that, in general terms, an exemplary method of calibrating an array of antenna elements in a receive mode includes locating the array of antenna elements 301, 301A in relation with a plurality of pre-characterized reference transmitters 309-1, 309-2 . . . 309-N. A further step includes sensing, at baseband frequencies, with the array of antenna elements, at a plurality of phase and gain settings, a receive radiation pattern of the array of antenna elements, received from the plurality of pre-characterized reference transmitters, to detect mismatch among two or more elements of the array of antenna elements. A still further step includes updating phase and gain settings for the array of antenna elements to correct the mismatch, as seen in FIG. 4.

In one or more embodiments, in the locating step, at least one of the plurality of pre-characterized reference transmitters is located at an expected side lobe 311, 313 of the array of antenna elements.

In at least some instances, the sensing is carried out while maintaining a highest main beam receiver gain for the array of antenna elements.

In some cases, in the locating step, the array of antenna elements includes a phased array.

In one or more embodiments, in the locating step, the plurality of pre-characterized reference transmitters include nominal duplicates ("golden chips" as discussed above) of the array of antenna elements, characterized via over-the-air radio frequency measurements.

Optionally, the complete beam pattern can be estimated for the array of antenna elements, as discussed above.

In another aspect, referring to FIGS. 1A and 1B, an antenna calibration system is provided for calibrating an array of antenna elements 103-1, 103-2 . . . 103-m in a transmit mode. The system includes an array of variable gain amplifiers and phase shifters 105-1, 105-2 . . . 105-m and 197-1, 197-2, 197-m corresponding to the array of antenna elements and having a transmit signal input 107 and a plurality of gain and phase control inputs (input to each amp and phase shifter from output of step 121). Also included are a plurality of pre-characterized reference detectors 109-1, 109-2 . . . 109-N, located in relation with the array of antenna elements, and positioned to sense, at baseband frequencies, at a plurality of phase and gain settings of the array of variable gain amplifiers and phase shifters, a transmit radiation pattern of the array of antenna elements, to detect mismatch among two or more elements of the array of antenna elements. The system further includes logic configured to update phase and gain settings of the array of variable gain amplifiers and phase shifters for the array of antenna elements to correct the mismatch. This logic takes as an input the received signal from each of the plurality of pre-characterized reference detectors 109-1, 109-2 . . . 109-N.

In one or more embodiments, the aforementioned logic carries out steps 117, 119, and 121, and is configured to update the phase and gain settings. The logic is implemented on a computer which senses the outputs from the references and carries out an optimization algorithm to maximize the energy in the desired lobe(s) (e.g., 115) and minimize the energy in undesirable lobe(s) (e.g., 111, 113). The output of the optimization algorithm per se is the desired sensed readings at the references 109 while the input(s) of the optimization algorithm per se are the independent variables (control signals—gain(s) and phase(s) of the amplifiers 105 and phase shifters 197). If there are m amplifiers there will be 2*m independent variables. What is being optimized is the beam pattern, which is sensed as the amount of power received at specific points (i.e. the references 109). The desired pattern is known; e.g., maximize power at reference 109-2 and minimize it at reference 109-1 and reference 109-N. In one or more embodiments, a linear optimization is undertaken and/or a convex optimization algorithm is employed.

The technique to identify the correct gain and phase coefficients can employ many existing closed-loop optimization algorithms. Since this is an optimization problem where we are already close to the optimum value, it is possible to use methods that can find a local minimum based on the estimated gradient of the objective function (here, a particular function of the radiation pattern). Examples of these methods include batch gradient descent, stochastic gradient descent, and mini-batch gradient descent. Furthermore, it is possible to use adaptive filter algorithms to estimate the amount of gain and phase errors in the phased array system. Examples of such algorithms include least mean squares (LMS), recursive least squares (RLS), and Kalman filters. Given the teachings herein, the skilled artisan will be able to select a suitable optimization technique to implement one or more embodiments.

In one or more embodiments, the plurality of pre-characterized reference detectors are located at an expected main lobe 215 and side lobes 211, 213 of the array of antenna elements (reference characters 211, 213, 215 employed since after calibration, lobes are in expected form).

In some instances, the claimed antenna calibration system does not include the array of antenna elements per se to be calibrated; rather, they are treated as a workpiece. In other instances, the array of antenna elements to be calibrated are themselves claimed as part of the system.

As noted, the reference detectors may, but need not, be so-called "golden" chips—thus, in some instances, the plurality of pre-characterized reference detectors include nominal duplicates of the array of antenna elements, characterized via over-the-air radio frequency measurements.

In a further aspect, referring to FIGS. 3A and 3B, an antenna calibration system for calibrating an array of antenna elements 303-1, 303-2 . . . 303-m in a receive mode includes an array of variable gain amplifiers and phase shifters 305-1, 305-2 . . . 305-m and 397-1, 397-2, 397-m corresponding to the array of antenna elements and having a receive signal output 307 and a plurality of gain and phase control inputs (input to each amp and phase shifter from output of step 321). Also included are a plurality of pre-characterized reference transmitters 309-1, 309-2 . . . 309-N, located in relation with the array of antenna elements, and positioned to radiate to the array of antenna elements. The system further includes logic configured to update phase and gain settings of the array of variable gain amplifiers and phase shifters for the array of antenna elements to correct mismatch among two or more elements of the array of antenna elements sensed, at baseband frequencies, with the array of antenna elements. This logic takes as an input the received signal 307 and the transmitted signal from each of the plurality of pre-characterized reference transmitters 309-1, 309-2 . . . 309-N.

In one or more embodiments, the aforementioned logic carries out steps 317, 319, and 321, and is configured to update the phase and gain settings. The logic is implemented on a computer which senses the received signal at each of the elements 303, and carries out an optimization algorithm to maximize the energy in the desired lobe(s) (e.g., 315) and minimize the energy in undesirable lobe(s) (e.g., 311, 313). The output of the optimization algorithm per se is the desired sensed readings at the elements 303 while the input(s) of the optimization algorithm per se are the independent variables (control signals—gain(s) and phase(s) of the amplifiers 305 and phase shifters 397). If there are m amplifiers there will be 2*m independent variables. What is being optimized is the beam pattern, which is sensed as the amount of power received at specific points (i.e. the elements 303). The desired pattern is known; e.g., maximize power in lobe 315 and minimize it at lobes 311, 313. Regarding the technique to identify the correct gain and phase coefficients, the above comments about optimization algorithms can be applied analogously in the receive-mode case of FIG. 3.

In one or more embodiments, the plurality of pre-characterized reference transmitters are located at an expected main lobe 415 and side lobes 411, 413 of the array of antenna elements (reference characters 411, 413, 415 employed since after calibration, lobes are in expected form).

In some instances, the claimed antenna calibration system does not include the array of antenna elements per se to be calibrated; rather, they are treated as a workpiece. In other instances, the array of antenna elements to be calibrated are themselves claimed as part of the system.

As noted, the reference transmitters may, but need not, be so-called "golden" chips—thus, in some instances, the plurality of pre-characterized reference transmitters include nominal duplicates of the array of antenna elements, characterized via over-the-air radio frequency measurements.

Elements of one or more embodiments of the invention can be implemented, at least in part, in the form of an apparatus including a memory and at least one processor that is coupled to the memory and operative to perform exemplary method steps.

Figure 7:
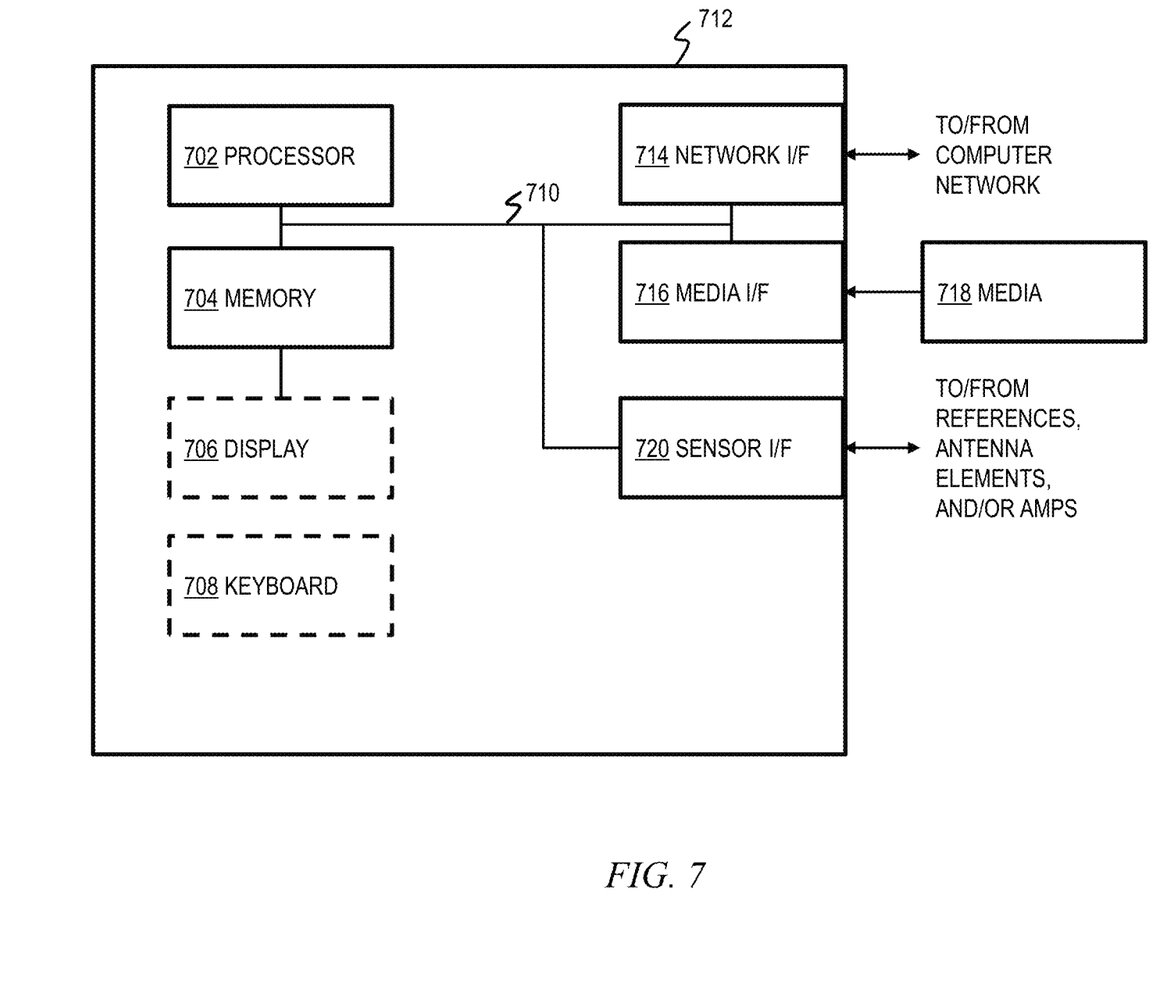
FIG. 7 shows an exemplary computer system, configured to implement aspects of the invention.

One or more embodiments can make use of software running on a general purpose computer or workstation (e.g., to implement steps 117, 119, 121 and/or 317, 319, 321 and/or to carry out optimization and/or amplifier and phase shifter gain and phase control). With reference to FIG. 7, such an implementation might employ, for example, a processor 702, a memory 704, and an input/output interface formed, for example, by a display 706 and a keyboard 708. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, one or more mechanisms for inputting data to the processing unit (for example, mouse), and one or more mechanisms for providing results associated with the processing unit (for example, printer). The processor 702, memory 704, and input/output interface such as display 706 and keyboard 708 can be interconnected, for example, via bus 710 as part of a data processing unit 712. Suitable interconnections, for example via bus 710, can also be provided to a network interface 714, such as a network card, which can be provided to interface with a computer network; to a media interface 716, such as a diskette or CD-ROM drive, which can be provided to interface with media 718; and/or to a sensor interface 720, such as analog-to-digital converter(s) or the like, which can be provided to interface with sensors or items to be controlled; e.g., the references, antenna elements, phase shifters, amps, etc.

Interfaces 714 and 720 are generally representative of a variety of techniques for communicating with and controlling the various elements discussed herein. For example, processor 702 can communicate with the references, antenna elements, phase shifters, amps, etc. over a wired or wireless computer network or directly with cabling.

A suitable optimization module may be stored in persistent memory and loaded into volatile memory to configure processor 702 to carry out the techniques described herein.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 702 coupled directly or indirectly to memory elements 704 through a system bus 710. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including but not limited to keyboards 708, displays 706, pointing devices, and the like) can be coupled to the system either directly (such as via bus 710) or through intervening I/O controllers (omitted for clarity).

Network adapters such as network interface 714 may also be coupled to the system to enable the data processing system to become coupled to other data processing systems or remote printers or storage devices through intervening private or public networks. Modems, cable modem and Ethernet cards are just a few of the currently available types of network adapters. In one or more embodiments, network interface 714 and/or sensor interface 720 collect data and also send control signals.

Computer-human interfaces can be provided using, for example, a suitable graphical user interface (GUI) wherein a server serves html out to a browser on a user's client machine. Interfaces between software and/or hardware elements can employ hard-wired connections, networks, database programs to retrieve parameters from persistent storage, application programming interfaces (APIs), shared data structures, and the like.

As used herein, including the claims, a "server" includes a physical data processing system (for example, system 712 as shown in FIG. 7) running a server program. It will be understood that such a physical server may or may not include a display and keyboard.

It should be noted that any of the methods described herein can include an additional step of providing a system comprising distinct software modules embodied on a computer readable storage medium; the modules can include, for example, any or all of the elements depicted in the block diagrams or other figures and/or described herein. The method steps can then be carried out using the distinct software modules and/or sub-modules of the system, as described above, executing on one or more hardware processors 702. Further, a computer program product can include a computer-readable storage medium with code adapted to be implemented to carry out one or more method steps described herein, including the provision of the system with the distinct software modules.

Exemplary System and Article of Manufacture Details

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method of calibrating an array of antenna elements in a receive mode, said method comprising the steps of:
    locating said array of antenna elements in relation with a plurality of pre-characterized reference transmitters;
    sensing, at baseband frequencies, with said array of antenna elements, at a plurality of phase and gain settings, a receive radiation pattern of said array of antenna elements, received from said plurality of pre-characterized reference transmitters, to detect mismatch among two or more elements of said array of antenna elements; and
    updating phase and gain settings for said array of antenna elements to correct said mismatch;
    further comprising estimating a complete beam pattern for said array of antenna elements, without considering network-level performance.

2. A method of calibrating an array of antenna elements in a receive mode, said method comprising the steps of:
    locating said array of antenna elements in relation with a plurality of pre-characterized reference transmitters;
    sensing, at baseband frequencies, with said array of antenna elements, at a plurality of phase and gain settings, a receive radiation pattern of said array of antenna elements, received from said plurality of pre-characterized reference transmitters, to detect mismatch among two or more elements of said array of antenna elements; and updating phase and gain settings for said array of antenna elements to correct said mismatch;

wherein, in said locating step, at least one of said plurality of pre-characterized reference transmitters is located at an expected side lobe of said array of antenna elements.

3. The method of claim 2, wherein said sensing is carried out while maintaining a highest main beam receiver gain for said array of antenna elements.

4. The method of claim 2, wherein, in said locating step, said array of antenna elements comprise a phased array.

5. The method of claim 2, wherein, in said locating step, said plurality of pre-characterized reference transmitters comprise nominal duplicates of said array of antenna elements, characterized via over-the-air radio frequency measurements.

6. The method of claim 2, further comprising estimating a complete beam pattern for said array of antenna elements.

7. An antenna calibration system for calibrating an array of antenna elements in a receive mode, said system comprising:

an array of variable gain amplifiers and phase shifters corresponding to the array of antenna elements and having a receive signal output and a plurality of gain and phase control inputs;

a plurality of pre-characterized reference transmitters, located in relation with the array of antenna elements, and positioned to radiate to the array of antenna elements; and logic configured to:

update phase and gain settings of said array of variable gain amplifiers and phase shifters for the array of antenna elements to correct mismatch among two or more elements of the array of antenna elements sensed, at baseband frequencies, with the array of antenna elements; and estimate a complete beam pattern for said array of antenna elements, without considering network-level performance.

8. An antenna calibration system for calibrating an array of antenna elements in a receive mode, said system comprising:

an array of variable gain amplifiers and phase shifters corresponding to the array of antenna elements and having a receive signal output and a plurality of gain and phase control inputs;

a plurality of pre-characterized reference transmitters, located in relation with the array of antenna elements, and positioned to radiate to the array of antenna elements; and logic configured to update phase and gain settings of said array of variable gain amplifiers and phase shifters for the array of antenna elements to correct mismatch among two or more elements of the array of antenna elements sensed, at baseband frequencies, with the array of antenna elements;

wherein said plurality of pre-characterized reference transmitters are located at an expected main lobe and side lobes of the array of antenna elements.

9. The antenna calibration system of claim 8, further comprising said array of antenna elements.

10. The antenna calibration system of claim 9, wherein said plurality of pre-characterized reference transmitters comprise nominal duplicates of the array of antenna elements, characterized via over-the-air radio frequency measurements.

* * * * *